(12) United States Patent
Hoshizuki et al.

(10) Patent No.: US 11,423,297 B2
(45) Date of Patent: Aug. 23, 2022

(54) PROCESSING APPARATUS, PROCESSING METHOD, AND NONVOLATILE RECORDING MEDIUM

(71) Applicant: AXELL CORPORATION, Tokyo (JP)

(72) Inventors: Yusuke Hoshizuki, Tokyo (JP); Masashi Michigami, Tokyo (JP)

(73) Assignee: AXELL CORPORATION, Tokyo (JP)

(*) Notice: Subject to any disclaimer, the term of this patent is extended or adjusted under 35 U.S.C. 154(b) by 839 days.

(21) Appl. No.: 16/162,799

(22) Filed: Oct. 17, 2018

(65) Prior Publication Data
US 2019/0138899 A1 May 9, 2019

(30) Foreign Application Priority Data
Nov. 8, 2017 (JP) .............................. JP2017-215388

(51) Int. Cl.
 *G06N 3/04* (2006.01)
 *G06N 3/08* (2006.01)
 *H04L 9/00* (2022.01)

(52) U.S. Cl.
 CPC .............. *G06N 3/08* (2013.01); *G06N 3/0481* (2013.01); *H04L 9/008* (2013.01)

(58) Field of Classification Search
 CPC .......... G06N 3/08; G06N 3/0481; G06N 3/04; H04L 9/008; H04L 9/00
 See application file for complete search history.

(56) References Cited

U.S. PATENT DOCUMENTS

| | | | | |
|---|---|---|---|---|
| 10,867,247 | B1* | 12/2020 | Teig | G06N 3/084 |
| 2015/0106313 | A1* | 4/2015 | Eklund | G06N 3/02 |
| | | | | 706/21 |

(Continued)

FOREIGN PATENT DOCUMENTS

| | | |
|---|---|---|
| JP | H07-282038 A | 10/1995 |
| JP | H11-000707 A | 1/1999 |

(Continued)

OTHER PUBLICATIONS

Zhu et al. "A Fourier Series Neural Network and Its Application to System Identification", J. DSMC, 1995, pp. 253-26.*

(Continued)

*Primary Examiner* — Li Wu Chang
(74) *Attorney, Agent, or Firm* — Oliff PLC

(57) ABSTRACT

A technique capable of providing a new function usable as an activation function is provided. An inference apparatus includes a receiving unit that receives input of target data; and an inference unit that executes a predetermined inference process with respect to the target data using a neural network model. The neural network model includes a plurality of processing layers, and, as the processing layers, one or more activation function layers that convert an input value by a predetermined activation function. The activation function of at least one of the activation function layers is configured as a function of a waveform the output value of which changes, in a first range, to approach a maximum value as an input value increases and, in a second range, away from a minimum value as the input value increases, such that the output values in the first and second ranges are not the same.

9 Claims, 10 Drawing Sheets

(56) References Cited

U.S. PATENT DOCUMENTS

2016/0350648 A1 12/2016 Gilad-Bachrach et al.
2020/0094405 A1* 3/2020 Davidson ................. B25J 9/161

FOREIGN PATENT DOCUMENTS

JP 2016-218513 A 12/2016
JP 2017-187850 A 10/2017

OTHER PUBLICATIONS

Shunpei "Neural Network and Computer Program Therefor", 2016, pp. 31 (English translation JP 2016-218513).*
Nakahara et al. A Deep Convolutional Neural Network Based on Nested Residue Number System, 2015, IEEE Xplore, pp. 6.*
Yonekawa, Haruyoshi et al., "Accelerated Temarized Deep Neural Network By Sparse Matrix Calculation", The Institute of Electronics, Information and Communication Engineers, pp. 1-7, (2017).
Feb. 18, 2020 Office Action issued in Japanese Patent Application No. 2017-215388.
Oct. 6, 2020 Office Action issued in Japanese Patent Application No. 2017-215388.
Urita, Kenji et al. "Neuron models with a periodical continuous value output function", p. 53-58, vol. 93, No. 512, (1994).

* cited by examiner

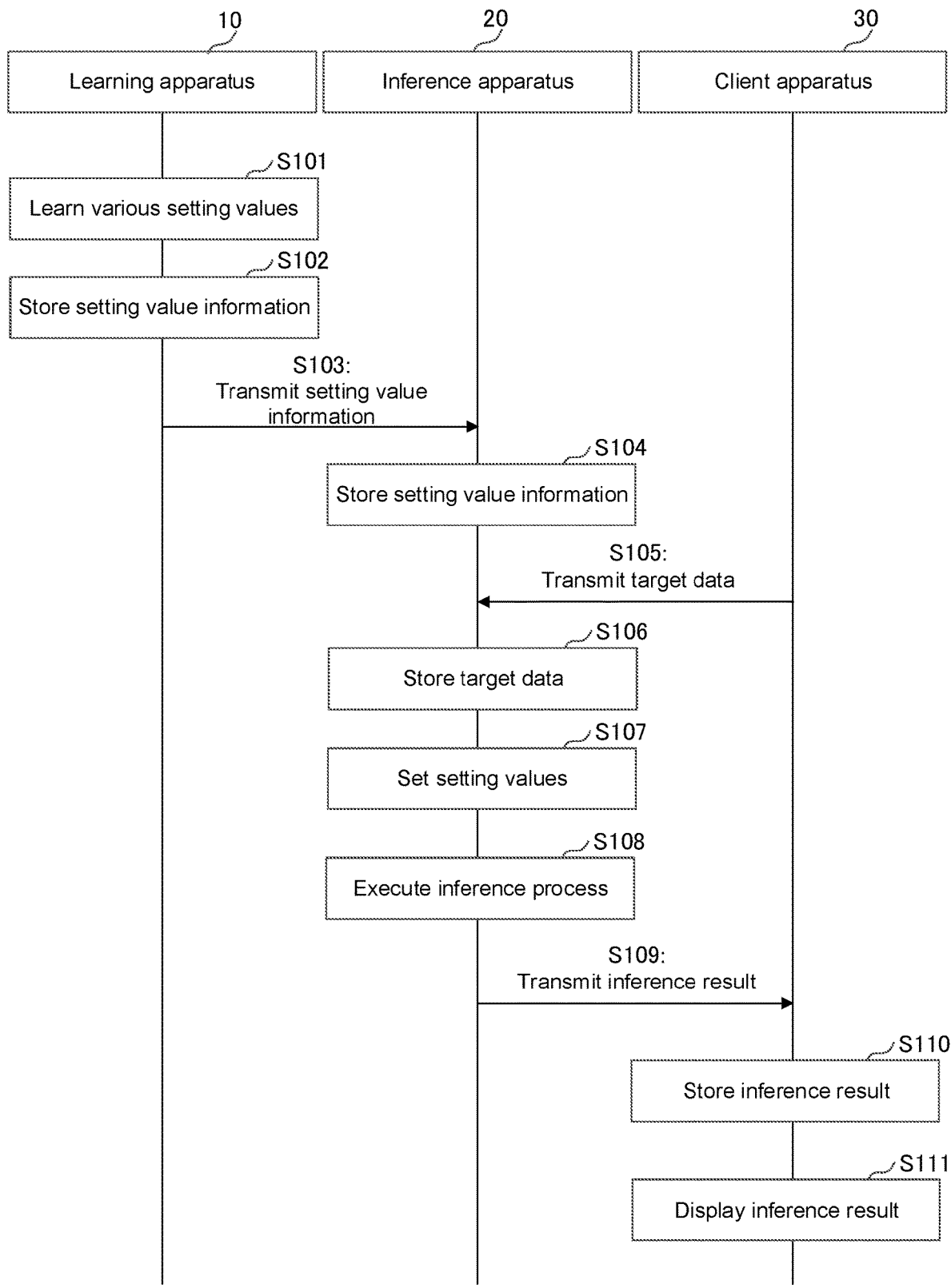

FIG. 10

|  |  | Example1 | Example2 | Reference1 | Reference2 |
|---|---|---|---|---|---|
| Used activation function | During learning (forward propagation) | Modulo operation function | Modulo operation function | Approximate polynomial | ReLU |
|  | During learning (backward propagation) | Hyperbolic function (tanh) | Trigonometric function (sin) | Approximate polynomial | ReLU |
|  | During inference | Modulo operation function | Modulo operation function | Approximate polynomial | ReLU |
| Correct answer rate | Average | 94.5% | 94.4% | 90.3% | 95.5% |
|  | Minimum | 90.0% | 89.5% | 84.5% | 92.0% |
|  | Maximum | 98.0% | 98.0% | 94.0% | 98.5% |

PROCESSING APPARATUS, PROCESSING METHOD, AND NONVOLATILE RECORDING MEDIUM

CROSS-REFERENCE TO PRIOR APPLICATION

This application relates to and claims the benefit of priority from Japanese Patent Application No. 2017-215388 filed on Nov. 8, 2017, the entire disclosure of which is incorporated herein by reference.

BACKGROUND

The embodiments discussed herein are related to an inference apparatus and the like that use a neural network (NN) model, for example.

Conventionally, a recognition process (an inference process) for recognizing images, characters, voice, and the like is performed using a neural network model which is one of machine learning architectures.

The learnt coefficient data in a neural network model has a large size, and is therefore a large load for a client apparatus only to process and it is difficult to execute the processing. In contrast, there are needs for using cloud resources capable of performing large-scale operations in an inference process and the like of a neural network model by using a client-server model.

In a neural network model, an activation function layer that performs a transform process based on an activation function is provided at a posterior stage of a processing layer that performs a linear transform process. A sigmoid function or a ReLU function (a Rectified Linear Unit Rectifier), for example, is used as the activation function.

For example, the specification of U.S. Patent Application Publication No. 2016/0350648 discloses a technique related to a neural network which uses an approximate polynomial as an activation function.

SUMMARY

In a neural network model, there is a possibility that a recognition rate in a recognition process which uses a neural network model varies depending on an used activation function and the type of input data or the like. Due to this, it is difficult to uniformly determine which activation function is optimal to use. Under such a situation, it may be desirable to select an activation function depending on a situation among a plurality of activation functions. When this is taken into consideration, it is desirable that an activation function can be selected from many candidates.

When cloud resources capable of performing large-scale operations are used in an inference process or the like of a neural network model by using a client-server model, since high-security information such as personal information has to be transmitted to a server, there is a risk that information may leak.

The present invention has been made in view of the problems, and an object thereof is to provide a technique capable of providing a new activation function usable in a neural network model.

In order to attain the object, a processing apparatus according to a first aspect is a processing apparatus that executes a predetermined process using a neural network model, the processing apparatus including: an input unit that receives input data to be input to the neural network model; and a processor configured to execute a process including: executing the predetermined process with respect to the input data using the neural network model, wherein the neural network model includes a plurality of processing layers, and, as the processing layers, one or more activation function layers that convert an input value by a predetermined activation function, and the activation function of at least one of the activation function layers is a function of a waveform which increases continuously and decreases discontinuously at some values only or a waveform which decreases continuously and increases discontinuously at some values only, or a differentiable approximate function approximated to the waveform.

In the processing apparatus, the predetermined process may be a predetermined inference process, and pre-learned setting values may be set to the neural network model.

In the processing apparatus, the setting values may be a value input from a learning apparatus including: a processor configured to execute a process including: learning setting values of a learning target neural network model on the basis of learning data using the learning target neural network model; and a learning result storage unit that stores the setting values of the learning target neural network model learned by the processor, wherein the neural network model includes a plurality of processing layers, and, as the processing layers, one or more activation function layers that convert an input value by a predetermined activation function, and the activation function of at least one of the activation function layers is a function of a waveform which increases continuously and decreases discontinuously at some values only or a waveform which decreases continuously and increases discontinuously at some values only, or a differentiable approximate function approximated to the waveform.

In the processing apparatus, the neural network model may be a learning target neural network model, the processor may be configured to execute a process including: learning setting values of the learning target neural network model on the basis of the input data using the learning target neural network model, and the processing apparatus may further include a learning result storage unit configured to store the setting values of the learning target neural network model learned by the process execution unit.

In the processing apparatus, the processor may be configured to execute a process including: using, when forward propagation based on the neural network model is executed, the function of the waveform as the activation function of at least one of the activation function layers, and using, when backward propagation is executed to update the setting values of the neural network model, the approximate function as the activation function of at least one of the activation function layers.

In the processing apparatus, the approximate function may be a hyperbolic function.

In order to attain the object, a processing method according to a second aspect is a processing method executed by a processor to control a processing apparatus, the processing method including the process executed by the processor including: receiving input data to be input to the neural network model; and executing a predetermined process with respect to the input data using a neural network model, wherein the neural network model includes a plurality of processing layers, and, as the processing layers, one or more activation function layers that convert an input value by a predetermined activation function, and the activation function of at least one of the activation function layers is a function of a waveform which increases continuously and decreases discontinuously at some values only or a waveform which decreases continuously and increases discontinuously at some values only, or a differentiable approximate function approximated to the waveform.

In order to attain the object, a nonvolatile recording medium according to a third aspect is a computer-readable nonvolatile recording medium having stored therein a processing program for causing a processor to execute a process, the process including: receiving input data to be input to a neural network model; and executing a predetermined process with respect to the input data using the neural network model, wherein the neural network model includes a plurality of processing layers, and, as the processing layers, one or more activation function layers that convert an input value by a predetermined activation function, and the activation function of at least one of the activation function layers is a function of a waveform which increases continuously and decreases discontinuously at some values only or a waveform which decreases continuously and increases discontinuously at some values only, or a differentiable approximate function approximated to the waveform.

According to the present invention, a new function usable as an activation function can be provided.

BRIEF DESCRIPTION OF THE DRAWINGS

FIG. 9 is a sequence diagram illustrating an operation of a processing system according to an embodiment; and FIG. 10 is a diagram for describing a recognition result of image recognition in a processing system according to an embodiment.

DETAILED DESCRIPTION OF THE EMBODIMENT

Hereinafter, embodiments will be described with reference to the drawings. The embodiments described below are not intended to limit the inventions according to the claims, and all elements and combinations thereof described in the embodiments are not necessarily essential to the solving means for the invention.

First, a processing system according to an embodiment will be described.

Figure 1:
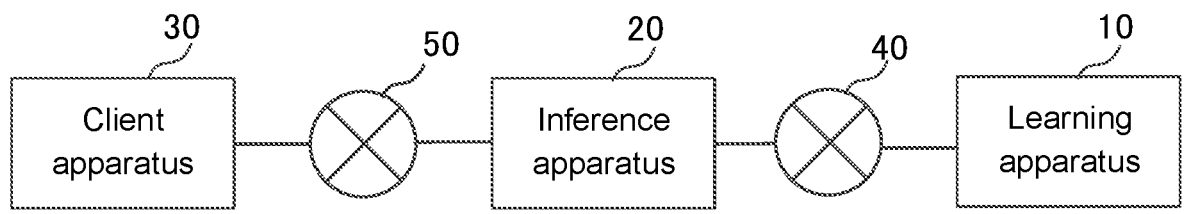
FIG. 1 is a diagram illustrating an entire configuration of a processing system according to an embodiment.

FIG. 1 is a diagram illustrating an entire configuration of a processing system according to an embodiment.

The processing system 1 includes a learning apparatus 10 as an example of a processing apparatus, an inference apparatus 20 as an example of the processing apparatus, and a client apparatus 30. The learning apparatus 10 and the inference apparatus 20 are coupled to each other via a network 40. Moreover, the inference apparatus 20 and the client apparatus 30 are coupled to each other via a network 50. The networks 40 and 50 are Local Area Networks (LANs), Wide Area Networks (WANs), or the like, for example. Although the networks 40 and 50 are separate networks in FIG. 1, these networks may be the same network.

The learning apparatus 10 performs learning of a neural network model. The inference apparatus 20 sets a neural network model on the basis of a learning result (setting values such as coefficients (weighting factors and/or biases) of the neural network model) of the neural network model obtained by the learning apparatus 10, and performs an inference process. The client apparatus 30 is an apparatus used by a user, for example, and transmits data (target data) serving as a target of an inference process to the inference apparatus 20 and receives the result (an inference result) of the inference process from the inference apparatus 20.

Figure 2:
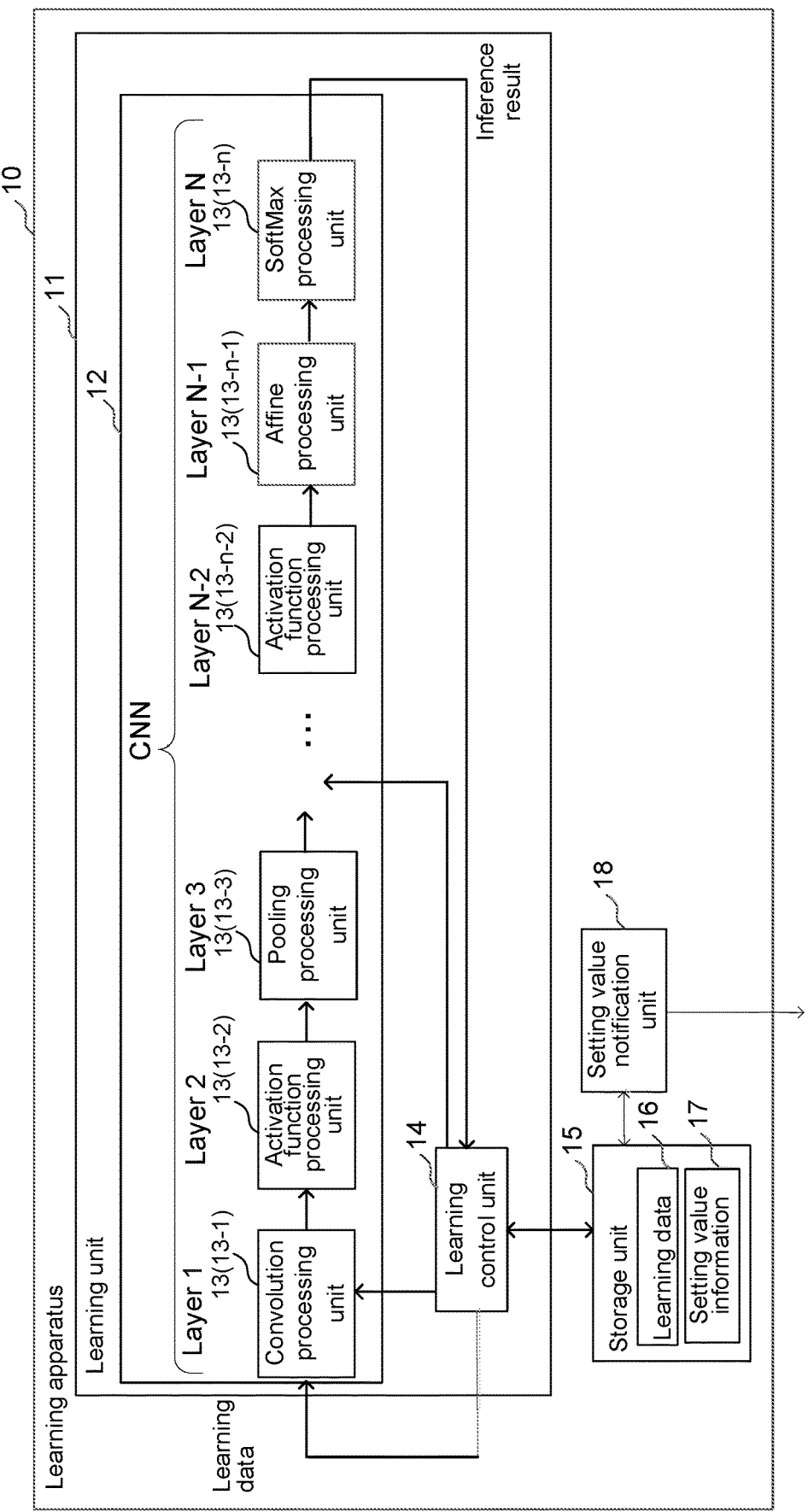
FIG. 2 is a diagram illustrating a functional configuration of a learning apparatus according to an embodiment.

FIG. 2 is a diagram illustrating a functional configuration of the learning apparatus according to an embodiment.

The learning apparatus 10 includes a learning unit 11, a storage unit 15 as an example of a learning result storage unit, and a setting value notification unit 18 as an example of a notification unit.

The learning unit 11 includes a neural network model 12 and a learning control unit 14.

The neural network model 12 is a model of a convolutional neural network (CNN) for executing an inference process of inferring what image data serving as a processing target represents and outputting an inference result, and includes a plurality of processing layers (layers). In the present embodiment, the neural network model 12 is used for performing learning of the setting values. In the example of FIG. 1, the neural network model 12 includes layers 1 to N. A process (a sub-process) in each layer is executed by each processing unit 13. For example, the neural network model 12 is a model for executing an inference process of inferring what image data serving as a processing target represents (for example, what such as a person, a dog, or a cat is included) and outputting an inference result. The number of layers of the neural network model 12 and the type and the content of a sub-process executed in each layer can be set arbitrarily.

The configuration of the neural network model 12 illustrated in FIG. 2 is an example only. In the example illustrated in FIG. 2, the neural network model 12 includes a convolution processing unit 13-1 that executes a sub-process of layer 1, an activation function processing unit 13-2 that executes a sub-process of layer 2 (an activation function layer), a pooling processing unit 13-3 that executes a sub-process of layer 3, an activation function processing unit 13-$n$-2 that executes a sub-process of layer N-2, an affine processing unit 13-$n$-1 that executes a sub-process of layer N-1, and a SoftMax processing unit 13-$n$ that executes a sub-process of layer N.

The convolution processing unit 13-1 performs a convolution process with respect to input image data using each of a plurality of pieces of filter data (an example of setting values). The activation function processing units 13-2, 13-$n$-2, and the like execute a process of converting data generated by the previous layers by an activation function. In the present embodiment, a function of a waveform the output value of which has any one of a finite range of values according to an input value for example, a function having a so-called sawtooth waveform (for example, a function including modulo operations (a reminder operation function)) or a differentiable approximate function approximated to such a waveform is used as an activation function of at least one of the activation function processing units 13-2, 13-$n$-2, and the like. A sawtooth waveform may be a waveform which increases continuously (increases monotonously) and decreases discontinuously at some values only or a waveform which decreases continuously (decreases monotonously) and increases discontinuously at some values only. Here, monotonous increase (monotonous decrease) may include increase (decrease) with a fixed inclination and increase (decrease) with a varying inclination. The differentiable approximate function approximated to a waveform may be a hyperbolic function (tanh or the like), a high-order (for example, a 20th-order or the like) trigonometric function, or a polynomial. When a hyperbolic function is used as the activation function, the processing amount is smaller and a necessary processing time is shorter than those when a high-order trigonometric function or a polynomial is used.

In the present embodiment, a method of backward propagation of errors (Backpropagation), for example, is used as a method of learning the setting values of the neural network model 12, the modulo operation function is used as the activation function when forward propagation is executed in the neural network model 12, and a differentiable approximate function which can be computed in the method of backward propagation of errors is used as the activation function when backward propagation is executed to update the setting values. When the method of backward propagation of errors is not used, the modulo operation function may be used in both cases of executing forward propagation and backward propagation.

Figure 3:
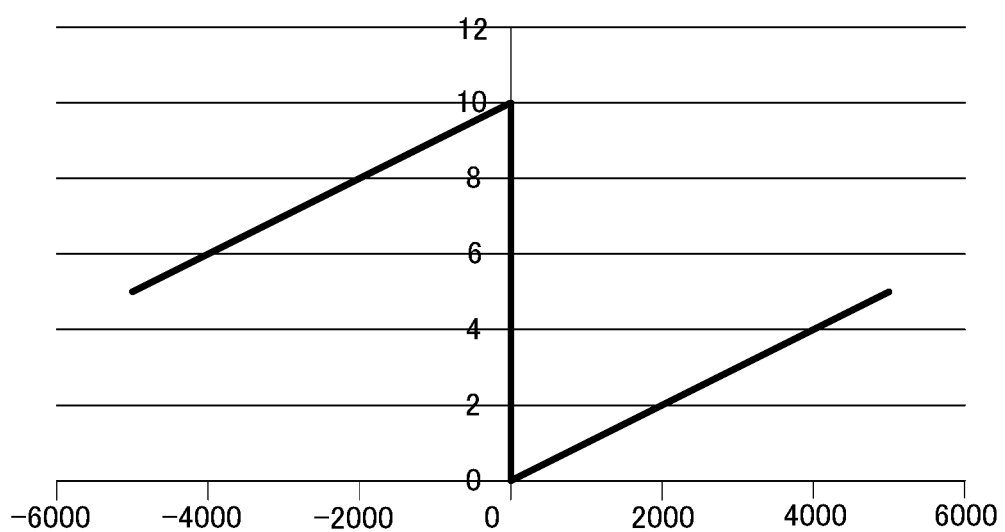
FIG. 3 is a diagram for describing an example of a modulo operation function used as an activation function according to an embodiment.

FIG. 3 is a diagram for describing an example of a modulo operation function used as an activation function according to an embodiment. In FIG. 3, the horizontal axis represents an input value input from a previous processing layer and the vertical axis represents an output value output by the modulo operation function.

This modulo operation function is a modulo operation function when a minimum value of an input value is larger than −5000 and a maximum value of the input value is smaller than 5000. This modulo operation function can be represented as (input value/1000) mod 10. A mod B represents a remainder when A is divided by B (a divisor). In the present embodiment, although the remainder includes a decimal part, the remainder may be an integer obtained by eliminating a decimal part.

This modulo operation function is a function of a waveform (so-called a sawtooth waveform) of which the output value changes to approach a maximum value as an input value increases in a range (a first range) from a minimum value of the input value to 0 (an example of a first value), the output value is 0 (the minimum value of the output value) when the input value is 0, and the output value changes away from the minimum value as the input value increases in a range (a second range) from the first value to a maximum value of the input value. In this modulo operation function, the output value in the first range and the output value in the second range are not the same. That is, it is possible to appropriately prevent input values having largely different values from being converted to the same output value. In the present embodiment, the activation function processing unit uses a function having a range equal to or smaller than a width corresponding to one tooth of the sawtooth of the function of a sawtooth waveform.

The modulo operation function illustrated in FIG. 3 is a function that divides an input value having a range larger than −5000 and smaller than 5000 by 1000 and computes a remainder of a value obtained after the division. According to this modulo operation function, the width of a range of values obtained after division of an input value can be made smaller than a divisor (that is, 10) used for modulo operation. The process of dividing the input value is a process for causing the width of a range of input values to fall within a width corresponding to one period (a range from a minimum value to a maximum value with increase in an input value) of modulo operation. In this manner, since the width of a range of values obtained after division of an input value can be made smaller than a divisor used for modulo operation, it is possible to appropriately prevent input values having largely different values from being converted to the same output value.

A value that divides an input value and a divisor of the modulo operation are not limited to the above-described values. For example, the value that divides an input value may be determined on the basis of a range of input values (that is, output values of a processing unit of a previous layer) input to each activation function processing unit. Moreover, the input value may not be divided. In this case, a large divisor may be used for modulo operation according to an input value.

Returning to FIG. 2, the pooling processing unit 13-3 executes a process of down-sampling input data. The affine processing unit 13-$n$-1 executes an affine transformation process with respect to input data. The SoftMax processing unit 13-$n$ executes a process based on the SoftMax function with respect to input data.

The learning control unit 14 inputs learning data 16 stored in the storage unit 15 to the neural network model 12 and learns setting values of the neural network model 12 on the basis of an inference result output from the neural network model 12. In the present embodiment, the learning control unit 14 uses a modulo operation function as an activation function of at least one of the activation function processing units 13-2, 13-$n$-2, and the like of the neural network model 12 when forward propagation is executed during learning and uses an approximate function as an activation function of at least one of the activation function processing units 13-2, 13-$n$-2, and the like of the neural network model 12 when backward propagation is executed during learning. When learning of the learning data 16 is finished, the learning control unit 14 stores setting values obtained by learning in the storage unit 15.

The storage unit 15 stores learning data 16 used for the learning unit 11 to learn the neural network model 12 and setting value information 17 which is information on the setting values such as coefficients of the neural network model 12. The learning data 16 may be stored in the storage unit 15 as teacher data correlated with the inference result data corresponding to the learning data 16. Examples of the setting values included in the setting value information 17 include coefficients of filters used by the convolution processing unit 13-1 and the like and weighting factors used by the affine processing unit 13-$n$-1 and the like.

The setting value notification unit 18 transmits the setting value information 17 stored in the storage unit 15 to the inference apparatus 20.

Next, a hardware configuration of the learning apparatus 10 will be described in detail.

Figure 4:
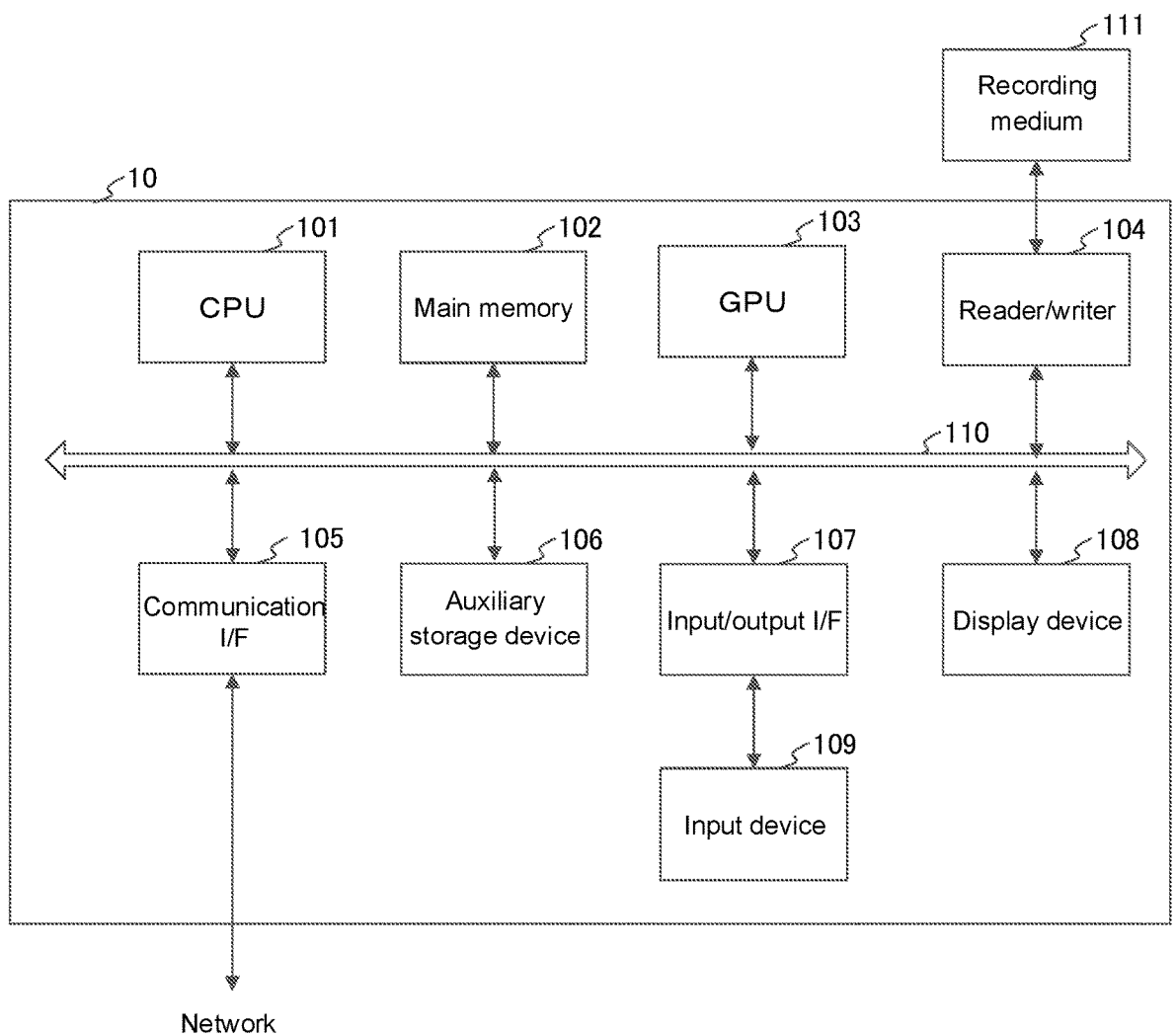
FIG. 4 is a diagram illustrating a hardware configuration of a learning apparatus according to an embodiment.

FIG. 4 is a diagram illustrating a hardware configuration of a learning apparatus according to an embodiment.

The learning apparatus 10 is configured, for example, by a computer including a Central Processing Unit (CPU) 101, a main memory 102, a Graphics Processing Unit (GPU) 103, a reader/writer 104, a communication interface (a communication I/F) 105, an auxiliary storage device 106, an input/output interface (an input/output I/F) 107, a display device 108, and an input device 109. The CPU 101, the main memory 102, the GPU 103, the reader/writer 104, the communication I/F 105, the auxiliary storage device 106, the input/output I/F 107, and the display device 108 are coupled to one another via a bus 110. Here, at least one of the main memory 102 and the auxiliary storage device 106 corresponds to the storage unit 15.

The CPU 101 controls the entire learning apparatus 10 in an integrated manner. The CPU 101 executes various processes by reading a program stored in the auxiliary storage device 106 into the main memory 102 and executing the program. In the present embodiment, the CPU 101 executes a processing program stored in the auxiliary storage device 106 to thereby form the activation function processing unit 13-2 and 13-n-2, the pooling processing unit 13-3, the affine processing unit 13-n-1, and the SoftMax processing unit 13-n of the neural network model 12 of the learning unit 11 and the learning control unit 14, for example.

The main memory 102 is a RAM, a ROM, or the like, for example, and stores various pieces of information and a program (a processing program or the like) executed by the CPU 101. The auxiliary storage device 106 is a non-transitory storage device (a nonvolatile storage device) such as, for example, an Hard Disk Drive (HDD) or an SSD (Solid State Drive) and stores various pieces of information and a program executed by the CPU 101. Examples of various pieces of information include learning data 16 and setting value information 17.

The GPU 103 is a processor suitable for execution of a specific process such as an image process, for example, and is appropriate for execution of processes performed in parallel, for example. In the present embodiment, the GPU 103 executes a predetermined process according to an instruction of the CPU 101. In the present embodiment, the GPU 103 forms the convolution processing unit 13-1 and the like of the neural network model 12 of the learning unit 11, for example.

The reader/writer 104 can attach and detach a recording medium 111 thereto and therefrom and performs reading of data from the recording medium 111 and writing of data in the recording medium 111. Examples of the recording medium 111 include a non-transitory recording medium (a nonvolatile recording medium) such as a SD memory card, an floppy (registered trademark) disk (FD), CD, DVD, BD (registered trademark), and a flash memory. In the present embodiment, a processing program may be stored in the recording medium 111 and be read by the reader/writer 104 so that the processing program can be used. Moreover, the learning data may be stored in the recording medium 111 and be read by the reader/writer 104 so that the learning data can be used.

The communication I/F 105 is coupled to the network 40 and transmits and receives data to and from other apparatuses (the inference apparatus 20 and the like) coupled to the network 40. For example, the setting value information is transmitted to the inference apparatus 20 coupled to the network 40 via the communication I/F 105. Here, the setting value notification unit 18 is formed by the communication I/F 105 and the CPU 101.

The input/output I/F 107 is coupled to the input device 109 such as a mouse and a keyboard, for example, and receives operations input by an administrator of the learning apparatus 10 from the input device 109.

A display device 108 is a display device such as a liquid crystal display, for example, and displays and outputs various pieces of information.

Next, the inference apparatus 20 will be described in detail.

Figure 5:
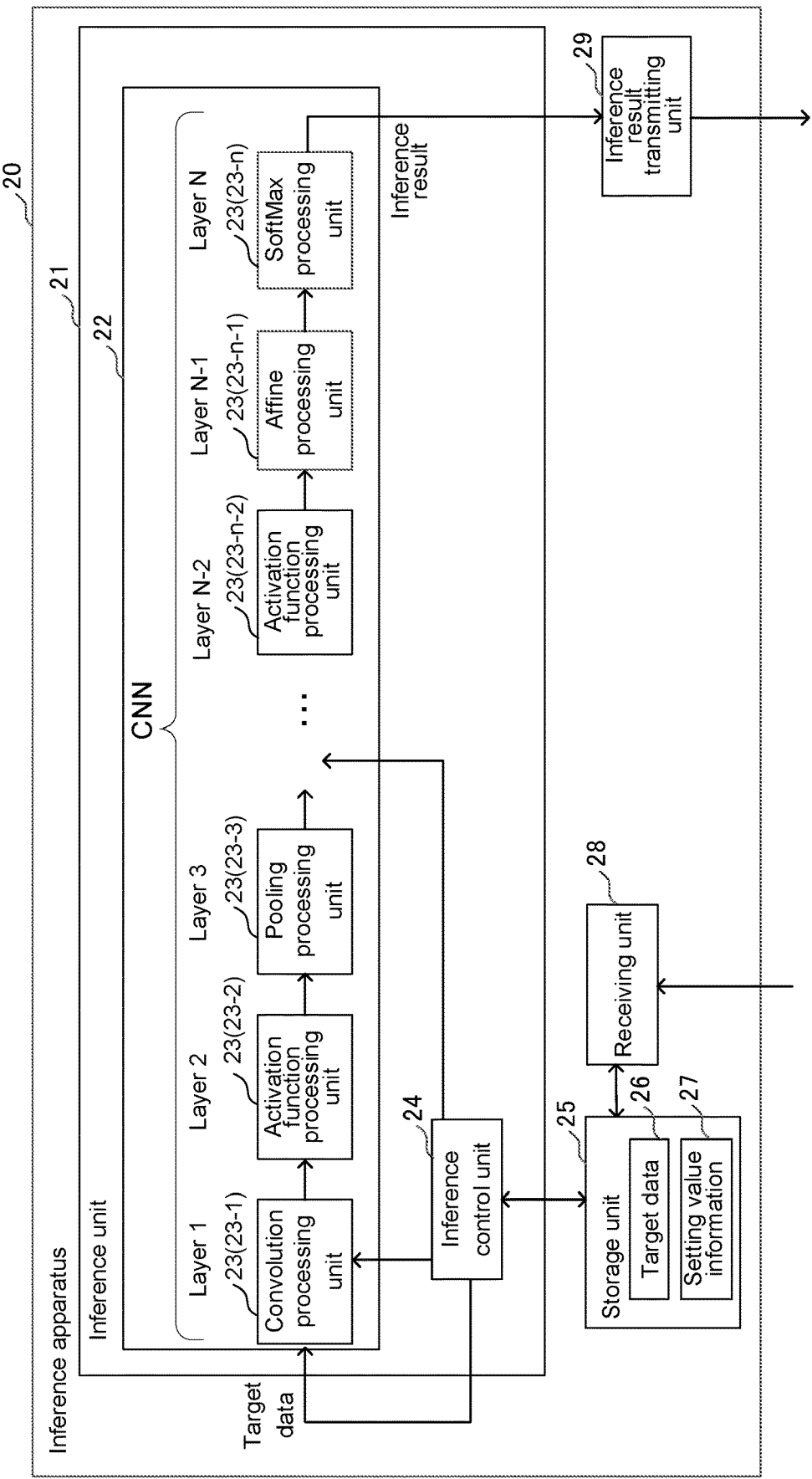
FIG. 5 is a diagram illustrating a functional configuration of an inference apparatus according to an embodiment.

FIG. 5 is a diagram illustrating a functional configuration of an inference apparatus according to an embodiment.

The inference apparatus 20 includes an inference unit 21, a storage unit 25, a receiving unit 28 as an example of an input unit, and an inference result transmitting unit 29.

The inference unit 21 includes a neural network model 22 and an inference control unit 24.

The neural network model 22 is a model of a convolutional neural network (CNN) for executing an inference process of inferring what image data serving as a processing target represents and outputting an inference result and includes a plurality of processing layers (layers). In the present embodiment, the neural network model 22 is a configuration (in the present embodiment, the same configuration as) corresponding to the neural network model 12 of the learning apparatus 10. That is, in the example of FIG. 5, the neural network model 22 includes layers 1 to N. A process (a sub-process) in each layer is executed by each processing unit 23. For example, the neural network model 22 is a model for executing an inference process of inferring what image data serving as a processing target represents (for example, what such as a person, a dog, or a cat is included) and outputting an inference result. The number of layers of the neural network model 22 and the type and the content of a sub-process executed in each layer can be set arbitrarily.

The configuration of the neural network model 22 illustrated in FIG. 5 is an example only. In the example illustrated in FIG. 5, the neural network model 22 includes a convolution processing unit 23-1 that executes a sub-process of layer 1, an activation function processing unit 23-2 that executes a sub-process of layer 2 (an activation function layer), a pooling processing unit 23-3 that executes a sub-process of layer 3, an activation function processing unit 23-n-2 that executes a sub-process of layer N-2, an affine processing unit 23-n-1 that executes a sub-process of layer N-1, and a SoftMax processing unit 23-n that executes a sub-process of layer N. The convolution processing unit 23-1, the activation function processing unit 23-2, the pooling processing unit 23-3, the activation function processing unit 23-n-2, the affine processing unit 23-n-1, and the SoftMax processing unit 23-n correspond respectively to the convolution processing unit 13-1, the activation function processing unit 13-2, the pooling processing unit 13-3, the activation function processing unit 13-n-2, the affine processing unit 13-n-1, and the SoftMax processing unit 13-n in FIG. 2, and execute the same processes as those of the corresponding units.

The activation function processing units 23-2, 23-n-2, and the like execute a process of converting data generated by the previous layers by an activation function. In the present embodiment, a function of a output value of which has any one of a finite range of values according to an input value, for example, a modulo operation function including modulo operations is used as an activation function of at least one of the activation function processing units 23-2, 23-n-2, and the like. In the present embodiment, the same activation function as the activation function of the activation function processing unit corresponding to the learning apparatus 10 is used as the activation function of the activation function processing units 23-2, 23-n-2, and the like.

The inference control unit 24 performs setting of the neural network model 22 on the basis of the setting value information 27 stored in the storage unit 25. That is, the inference control unit 24 sets the coefficients and the like of the processing layer. Moreover, the inference control unit 24 inputs the target data 26 which is processing target data to the neural network model 22 so that an inference process is executed by the neural network model 22. The inference control unit 24 receives input data via the receiving unit 28.

The storage unit 25 stores the target data 26 which is a target of an inference process to be executed by the neural network model 22 of the inference unit 21 and the setting value information 27 which is information on the setting values such as the coefficients and the like of the neural network model 22. Examples of the setting values included in the setting value information 27 include coefficients of filters used by the convolution processing unit 23-1 and the like and weighting factors used by the affine processing unit 23-*n*-1 and the like.

The receiving unit 28 receives the setting value information transmitted from the learning apparatus 10 and stores the setting value information in the storage unit 25. Moreover, the receiving unit 28 receives the target data 26 transmitted from the client apparatus 30 and stores the target data 26 in the storage unit 25.

The inference result transmitting unit 29 transmits the result (an inference result) of the inference process executed by the neural network model 22 of the inference unit 21 to the client apparatus 30.

Next, a hardware configuration of the inference apparatus 20 will be described in detail.

Figure 6:
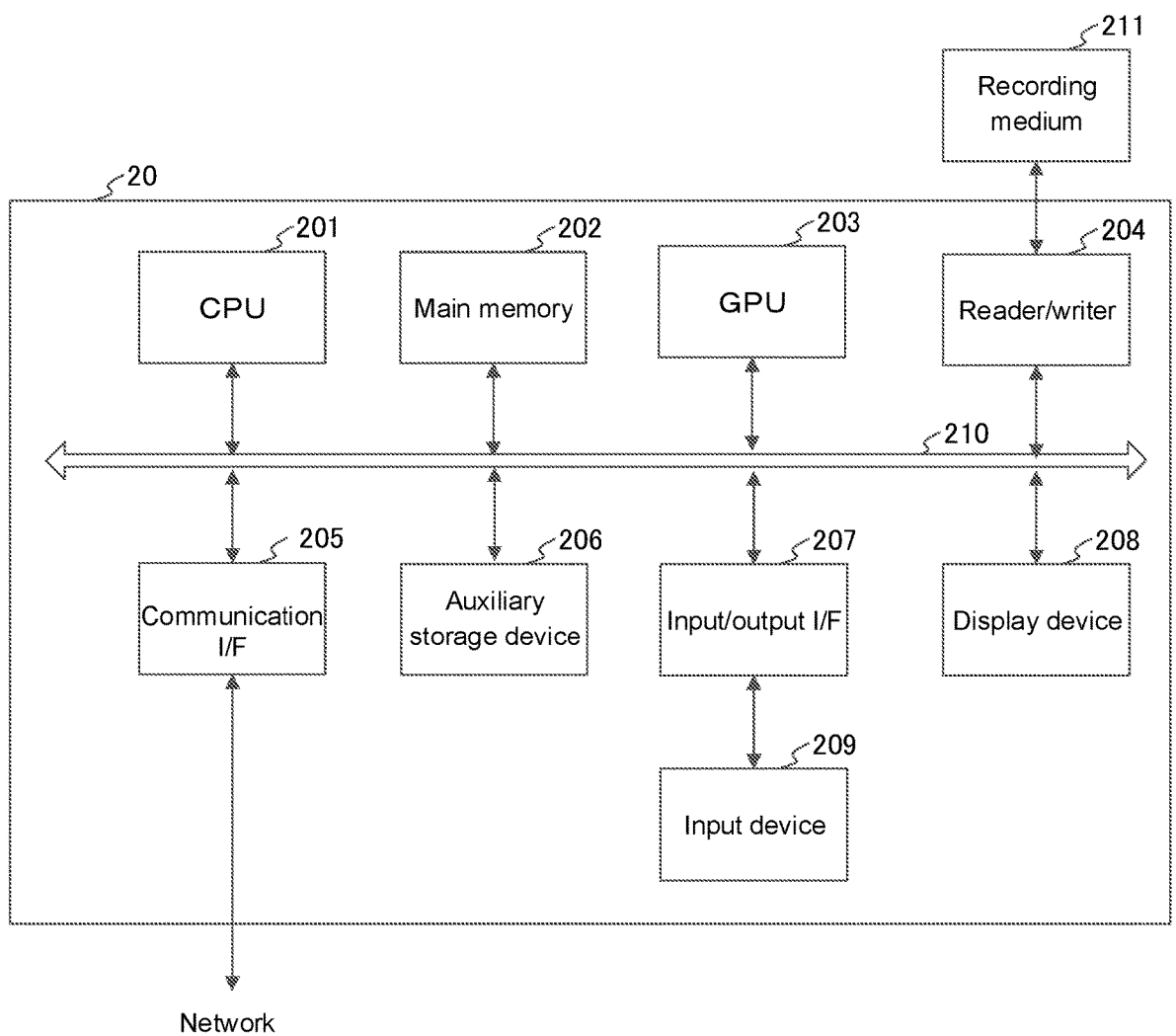
FIG. 6 is a diagram illustrating a hardware configuration of an inference apparatus according to an embodiment.

FIG. 6 is a diagram illustrating a hardware configuration of an inference apparatus according to an embodiment.

The inference apparatus 20 is configured, for example, by a computer including a CPU 201, a main memory 202, a GPU 203, a reader/writer 204, a communication I/F 205, an auxiliary storage device 206, an input/output I/F 207, a display device 208, and an input device 209. The CPU 201, the main memory 202, the GPU 203, the reader/writer 204, the communication I/F 205, the auxiliary storage device 206, the input/output I/F 207, and the display device 208 are coupled to one another via a bus 210. Here, at least one of the main memory 202 and the auxiliary storage device 206 corresponds to the storage unit 25.

The CPU 201 controls the entire inference apparatus 20 in an integrated manner. The CPU 201 executes various processes by reading a program stored in the auxiliary storage device 206 into the main memory 202 and executing the program. In the present embodiment, the CPU 201 executes a processing program stored in the auxiliary storage device 206 to thereby form the activation function processing unit 23-2 and 23-*n*-2, the pooling processing unit 23-3, the affine processing unit 23-*n*-1, and the SoftMax processing unit 23-*n* of the neural network model 22 of the learning unit 21 and the learning control unit 24, for example. In the present embodiment, the CPU 201 has a better processing performance than the CPU 301 to be described later, of the client apparatus 30.

The main memory 202 is a RAM, a ROM, or the like, for example, and stores various pieces of information and a program (a processing program or the like) executed by the CPU 201. The auxiliary storage device 206 is a non-transitory storage device such as, for example, a HDD or a SSD and stores various pieces of information and a program executed by the CPU 201. Examples of various pieces of information include target data 26 and setting value information 27.

The GPU 203 is a processor suitable for execution of a specific process such as an image process, for example, and is appropriate for execution of processes performed in parallel, for example. In the present embodiment, the GPU 203 executes a predetermined process according to an instruction of the CPU 201. In the present embodiment, the GPU 203 forms the convolution processing unit 23-1 and the like of the neural network model 22 of the inference unit 21, for example.

The reader/writer 204 can attach and detach a recording medium 211 thereto and therefrom and performs reading of data from the recording medium 211 and writing of data in the recording medium 211. Examples of the recording medium 211 include a non-transitory recording medium such as a SD memory card, an FD, CD, DVD, BD, and a flash memory. In the present embodiment, a processing program may be stored in the recording medium 211 and be read by the reader/writer 204 so that the processing program can be used.

The communication I/F 205 is coupled to the networks 40 and 50 and transmits and receives data to and from other apparatuses (the learning apparatus 10, the client apparatus 30, and the like) coupled to the networks 40 and 50. Here, the receiving unit 28 and the inference result transmitting unit 29 are formed by the communication I/F 205 and the CPU 201.

An input/output I/F 207 is coupled to an input device 209 such as a mouse and a keyboard, for example, and receives operations input by an administrator of the inference apparatus 20 from the input device 209.

A display device 208 is a display device such as a liquid crystal display, for example, and displays and outputs various pieces of information.

Next, the client apparatus 30 will be described in detail.

Figure 7:
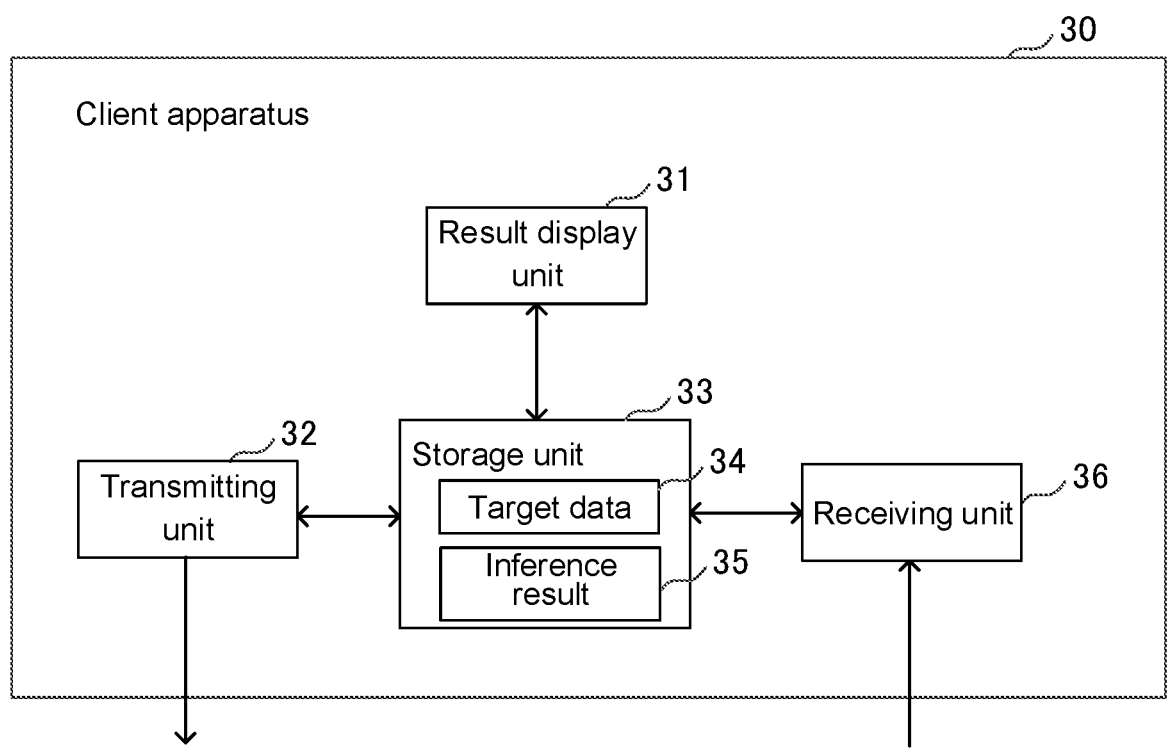
FIG. 7 is a diagram illustrating a functional configuration of a client apparatus according to an embodiment.

FIG. 7 is a diagram illustrating a functional configuration of a client apparatus according to an embodiment.

The client apparatus 30 includes a result display unit 31, a transmitting unit 32, a storage unit 33, and a receiving unit 36.

The storage unit 33 stores target data 34 that is subject to an inference process and an inference result 35 of the inference process. The inference result 35 is stored when an inference result is transmitted from the inference apparatus 20, and an inference result on the target data 34 that is not subject to an inference process of the inference apparatus 20 is not present.

The transmitting unit 32 transmits target data of an inference process to the inference apparatus 20. The receiving unit 36 receives an inference result of an inference process from the inference apparatus 20 and stores the inference result in the storage unit 33. The result display unit 31 displays and outputs various pieces of information on the basis of the inference result 35 stored in the storage unit 33. The result display unit 31 may display the inference result 35 as it is and may execute a predetermined process on the basis of the inference result 35 and display an execution result thereof.

Next, a hardware configuration of the client apparatus 30 will be described.

Figure 8:
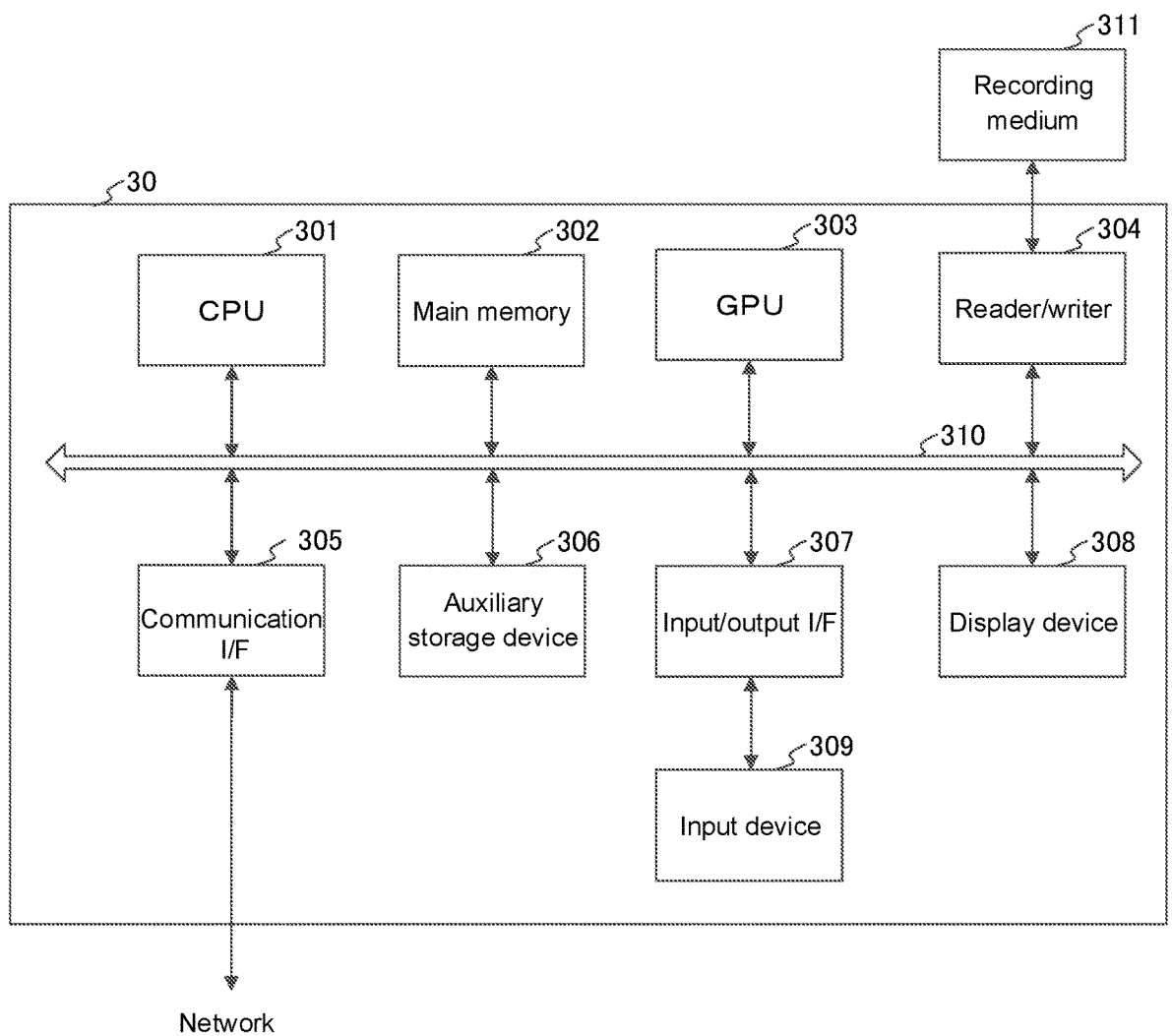
FIG. 8 is a diagram illustrating a hardware configuration of a client apparatus according to an embodiment.

FIG. 8 is a diagram of a hardware configuration of a client apparatus according to an embodiment.

The client apparatus 30 is configured, for example, by a computer including a CPU 301, a main memory 302, a GPU 303, a reader/writer 304, a communication I/F 305, an auxiliary storage device 306, an input/output I/F 307, a display device 308, and an input device 309. The client apparatus 301 may be a smartphone or a mobile terminal, for example. The CPU 301, the main memory 302, the GPU 303, the reader/writer 304, the communication I/F 305, the auxiliary storage device 306, the input/output I/F 307, and the display device 308 are coupled to one another via a bus 310. Here, at least one of the main memory 302 and the auxiliary storage device 306 corresponds to the storage unit 33.

The CPU 301 controls the entire client apparatus 30 in an integrated manner. The CPU 301 executes various processes by reading a program stored in the auxiliary storage device 306 into the main memory 302 and executing the program. In the present embodiment, the CPU 301 executes a processing program stored in the auxiliary storage device 306 to thereby form the result display unit 31, for example.

The main memory 302 is a RAM, a ROM, or the like, for example, and stores various pieces of information and a program (a processing program or the like) executed by the CPU 301. The auxiliary storage device 306 is a non-transitory storage device such as, for example, a HDD or a SSD and stores various pieces of information and a program executed by the CPU 301. Examples of various pieces of information include target data 34 and setting value information 35.

The GPU 303 is a processor suitable for execution of a specific process such as an image process, for example, and is appropriate for execution of processes performed in parallel, for example. In the present embodiment, the GPU 303 executes a predetermined process according to an instruction of the CPU 301.

The reader/writer 304 can attach and detach a recording medium 311 thereto and therefrom and performs reading of data from the recording medium 311 and writing of data in the recording medium 311. Examples of the recording medium 311 include a non-transitory recording medium such as a SD memory card, an FD, CD, DVD, BD, and a flash memory. In the present embodiment, a processing program may be stored in the recording medium 311 and be read by the reader/writer 304 so that the processing program can be used. Moreover, processing target data may be stored in the recording medium 311 and be read by the reader/writer 304 and stored in the storage unit 33.

The communication I/F 305 is coupled to the network 50 and transmits and receives data to and from other apparatuses (the inference apparatus 20, and the like) coupled to the network 50. Here, the transmitting unit 32 and the receiving unit 36 are formed by the communication I/F 305 and the CPU 301.

The input/output I/F 307 is coupled to the input device 309 such as a mouse and a keyboard, for example, and receives operations input by a user from the input device 309.

A display device 308 is a display device such as a liquid crystal display, for example, and displays and outputs various pieces of information.

FIG. 9 is a sequence diagram illustrating an operation of the processing system according to an embodiment. Referring to FIG. 9, a processing operation of the processing system 1 according to the present embodiment will be described.

The learning control unit 14 of the learning apparatus 10 causes the neural network model 12 of the learning unit 11 to execute an inference process using the learning data 16 stored in the storage unit 15 whereby various setting values of the processing unit 13 of the neural network model 12 are learned (S101). Subsequently, the learning control unit 14 stores setting value information on the setting values obtained by learning in the storage unit 15 (S102).

Subsequently, the setting value notification unit 18 reads the setting value information 17 stored in the storage unit 15 and transmits the setting value information 17 to the inference apparatus 20 (S103).

The receiving unit 28 of the inference apparatus 20 receives the setting value information 17 transmitted from the learning apparatus 10 and stores the setting value information 17 in the storage unit 25 (S104). Moreover, the transmitting unit 32 of the client apparatus 30 transmits the target data to the inference apparatus 20 (S105). The receiving unit 28 of the inference apparatus 20 receives inference target data from the client apparatus 30 and stores the target data in the storage unit 25 (S106). Either one of a time point at which the setting value information 17 is received or a time point at which the target data is received may be earlier than the other. That is, it is sufficient if both pieces of information are obtained until an inference process is executed.

The inference control unit 24 of the inference apparatus 20 acquires the setting value information 27 from the storage unit 25 and sets setting values with respect to the corresponding processing unit 23 of the neural network model 22 (S107). Subsequently, the inference control unit 24 reads the target data 26 from the storage unit 25 and inputs the target data 26 to the processing unit 23 of the first processing layer (layer 1) of the neural network model 22. As a result, an inference process for the target data 26 is executed by the neural network model 22, and the inference result is output from the processing unit 23 of the last processing layer (layer N) to the inference result transmitting unit 29 (S108).

Subsequently, the inference result transmitting unit 29 of the inference apparatus 20 transmits the inference result received from the neural network model 22 to the client apparatus 30 that has requested for an inference process on the target data (S109).

The receiving unit 36 of the client apparatus 30 receives the inference result from the inference apparatus 20 and stores the inference result in the storage unit 33 (S110). After that, the result display unit 31 displays and outputs the inference result on the basis of the inference result 35 stored in the storage unit 33 (S111).

Next, an inference result of an inference process on image data performed by the processing system 1 according to the present embodiment will be described. That is, a recognition result of image recognition will be described.

FIG. 10 is a diagram for describing a recognition result of image recognition in the processing system according to an embodiment. FIG. 10 illustrates results of image recognition in an example (Examples 1 and 2) in which a modulo operation function and an approximate function according to the present embodiment are used as an activation function used in each activation function processing unit of the neural network model, an example (Reference 1) in which a function which represents an existing activation function in an approximate polynomial is used, and an example (Reference 2) in which a ReLU function is used.

In Example 1, a neural network model including a convolution processing unit, an activation function processing unit, a pooling processing unit, a convolution processing unit, an activation function processing unit, a pooling processing unit, a convolution processing unit, an activation function processing unit, an affine processing unit, an activation function processing unit, an affine processing unit, and a SoftMax processing unit in that order from the starting layer is used as the neural network models 12 and 22 to be used during learning and inference. Such a modulo operation function as illustrated in FIG. 3 is used during inference and forward propagation of learning as an activation function of each activation function processing unit. A hyperbolic function that approximates to the waveform of the modulo operation function is used as an approximate function during backward propagation of learning.

A learning process of the neural network model 12 was performed using learning data in an MNIST data set, image recognition was performed by inputting test data of the MNIST data set to the neural network model 22 in which the setting values obtained by the learning process were set, and correct answer rates of the recognition result obtained through the image recognition were measured. In Example 1, the minimum of the correct answer rate was 90.0%, the maximum of the correct answer rate was 98.0%, and the average of the correct answer rate was 94.5%.

In Example 2, such a modulo operation function as illustrated in FIG. 3 is used during inference and forward propagation of learning as the activation function of each activation function processing unit, and a high-order trigonometric function that approximates to the waveform of the modulo operation function is used as an approximate function during backward propagation of learning.

A learning process of the neural network model 12 was performed using learning data in an MNIST data set, image recognition was performed by inputting test data of the MNIST data set to the neural network model 22 in which the setting values obtained by the learning process were set, and correct answer rates of the recognition result obtained through the image recognition were measured. In Example 2, the minimum of the correct answer rate was 89.5%, the maximum of the correct answer rate was 98.0%, and the average of the correct answer rate was 94.4%.

In Reference 1, a function which represents an existing activation function (a ReLU function or the like) in an approximate polynomial was used as the activation function of each activation function processing unit of the neural network models 12 and 22, a learning process and the inference process were performed in a manner similar to Examples, and correct answer rates of the recognition result obtained through the image recognition were measured. In Reference 1, the minimum of the correct answer rate was 84.5%, the maximum of the correct answer rate was 94.0%, and the average of the correct answer rate was 90.3%.

In Reference 2, a ReLU function was used as an activation function of each activation function processing unit of the neural network models 12 and 22, a learning process and an inference process were performed in a manner similar to Examples, and correct answer rates of the recognition result obtained through the image recognition were measured. In Reference 2, the minimum of the correct answer rate was 92.0%, the maximum of the correct answer rate was 98.5%, and the average of the correct answer rate was 95.5%.

Referring to the correct answer rates in Examples 1 and 2 and References 1 and 2, it can be understood that a relatively high correct answer rate can be realized similarly to the case of using the ReLU function and the approximate polynomial function in Examples 1 and 2. Therefore, it is understood that the modulo operation function and the approximate function of the waveform of the modulo operation function can be used as the activation function of the neural network, that is, such a function is sufficiently worth using. As a result, this modulo operation function and the approximate function of the waveform of the modulo operation function becomes a new candidate for the activation function of the neural network model.

The present invention is not limited to the above-described embodiments but can be modified appropriately without departing from the scope of the present invention.

For example, in the above-described embodiment, the target data transmitted from the client apparatus 30 to the inference apparatus 20 may be data (encryption data) encrypted by additive homomorphic encryption. Here, the additive homomorphic encryption is a technique in which a result obtained by performing additive operation on a plain text data space with respect to non-encrypted data (plain text data) is obtained by decrypting a result obtained by performing operation (corresponding operation) on an encryption data space corresponding to the additive operation with respect to encryption data. That is, the additive homomorphic encryption is a technique of obtaining a result obtained by performing additive operation with respect to plain text data by performing corresponding operation with respect to encryption data and decrypting the operation result. Paillier encryption is known as an example of the additive homomorphic encryption. In Paillier encryption, an additive operation on a plain text data space is a multiplication operation on an encryption data space.

When encryption data is used as target data, an operation on a plain text data space compatible with additive homomorphic encryption is limited to an additive operation. Therefore, each processing unit in the neural network model 12 needs to be configured to execute processes of operations compatible with additive homomorphic encryption. Here, a modulo operation function (excluding a function of dividing an input value itself) is an operation compatible with additive homomorphic encryption. For example, a modulo operation function or an approximate function may be used as an activation function of the activation function processing unit of the neural network model 12.

On the other hand, in each processing unit in the neural network model 22, a corresponding operation on the encryption data space may be used as the operation on the plain text data space of each processing unit of the neural network model 12. Specifically, the activation function processing unit may use a corresponding operation corresponding to the modulo operation function.

Since the SoftMax processing unit 13-$n$ of the neural network model 12 includes operations that are not compatible with the additive homomorphic encryption, the SoftMax processing unit 23 needs to be eliminated from the neural network model 22, and the client apparatus 30 needs to include a processing unit (in this example, a processing unit similar to the SoftMax processing unit 13-$n$) corresponding to the SoftMax processing unit 23. In this case, the processing result from a processing unit immediately previous to the SoftMax processing unit 23 is transmitted from the inference apparatus 20 to the client apparatus 30, the client apparatus 30 decrypts the processing result received from the inference apparatus 20 and then executes a process of the processing unit corresponding to the SoftMax processing unit 23 whereby a final inference result is acquired.

By using encryption data as target data in this manner, information can be prevented from leaking to the inference apparatus 20 and the inference apparatus 20 can execute an inference process (including a partial process of the inference process) with respect to encryption data as it is.

The above-described embodiments illustrate an example in which the present invention is applied to a processing system in which CNN that performs image recognition is configured. However, the present invention can be applied to a processing system in which a neural network that executes an inference process other than image recognition is configured.

In the above-described embodiments, an activation function is used as the modulo operation function. However, the present invention is not limited thereto, and a function other than the modulo operation function may be used as long as the function achieves a similar change.

In the above-described embodiments, the activation function may be a function of a waveform the output value of which changes to approach a minimum value as an input value increases in a range (a first range) from a minimum value of the input value to a first value, the output value is a maximum value of the output value when the input value is the first value, and the output value changes away from the maximum value as the input value increases in a range (a second range) from the first value to a maximum value of the input value or may be a function approximated to this waveform. That is, the activation function may be a function of a waveform the output value of which changes to approach one of the maximum value and the minimum value of the output value as the input value increases in the first range from the minimum value of the input value to the first value, the output value changes away from the other of the maximum value and the minimum value of the output value as the input value increases in the second range from the first value to the maximum value of the input value, and the output value in the first range and the output value in the second range are not the same or may be a function approximated to this waveform.

In the above-described embodiments, at least a portion of the functional units formed when the CPU 101 of the learning apparatus 10, the CPU 201 of the inference apparatus 20, or the CPU 301 of the client apparatus 30 executes a program may be formed by another processor in each apparatus or a hardware circuit executing a specific process. Moreover, the processing unit 13 (the convolution processing unit 13-1 or the like) formed by the GPU 103 of the learning apparatus 10 may be formed by the CPU 101 or may be formed by another hardware circuit. Furthermore, the processing unit 23 (the convolution processing unit 23-1 or the like) formed by the GPU 203 of the inference apparatus 20 may be formed by the CPU 201 or may be formed by another hardware circuit.

In the above-described embodiments, the receiving unit 28 has been described as an example of an input unit that receives target data. However, the present invention is not limited thereto, and the input unit may be a reader/writer that reads target data from a recording medium having the target data stored therein or may be a camera that fetches image data serving as target data.

In the above-described embodiments, the learning apparatus 10 and the inference apparatus 20 are configured as separate hardware components. However, the present invention is not limited thereto, and the apparatuses may be configured as the same hardware component.

In the above-described embodiments, the inference apparatus 20 and the client apparatus 30 are configured as separate hardware components. However, the present invention is not limited thereto, and the inference apparatus 20 and the client apparatus 30 may be configured as the same hardware components as long as the client apparatus 30 has sufficient processing performance.

What is claimed is:

1. A processing apparatus configured to execute a predetermined process using a neural network model, the processing apparatus comprising:
a data memory configured to store input data to be input to the neural network model; and
a processor configured to execute the predetermined process with respect to the input data stored in the data memory using the neural network model, the neural network model including a plurality of processing layers including one or more activation function layers that convert an input value by using a predetermined activation function, the predetermined activation function of the one or more of the activation function layers being a modulo operation function including a modulo operation and a division operation executed before the modulo operation, the division operation outputting a quotient of division by a divisor to the modulo operation, and the divisor of the division operation is set such that a range of values obtained by the division operation on the input value is smaller than a modulus of the modulo operation.

2. A processing method executed by a processor configured to control a processing apparatus, the processing method comprising:
executing a predetermined process with respect to input data using a neural network model, the neural network model including a plurality of processing layers including one or more activation function layers that convert an input value by using a predetermined activation function, the predetermined activation function of the one or more of the activation function layers being a modulo operation function including a modulo operation and a division operation executed before the modulo operation, the division operation outputting a quotient of division by a divisor to the modulo operation, and the divisor of the division operation is set such that a range of values obtained by the division operation on the input value is smaller than a modulus of the modulo operation.

3. A non-transitory computer readable storage medium storing a processing program configured to cause a processor apparatus to execute a predetermined process using a neural network model, the predetermined process comprising:
storing, in a data memory, input data to be input to the neural network model; and
executing the predetermined process with respect to the input data stored in the data memory using the neural network model, the neural network model including a plurality of processing layers including one or more activation function layers that convert an input value by using a predetermined activation function, the predetermined activation function of the one or more of the activation function layers being a modulo operation function including a modulo operation and a division operation executed before the modulo operation, the division operation outputting a quotient of division by a divisor to the modulo operation, and the divisor of the division operation is set such that a range of values obtained by the division operation on the input value is smaller than a modulus of the modulo operation.

4. An inference apparatus configured to execute a predetermined inference process using a neural network model, the inference apparatus comprising:
a target data input device including a receiver configured to receive input target data, and a memory configured to store the received input target data; and
a processor configured to execute the predetermined inference process with respect to the target data stored in the memory using the neural network model, the neural network model including a plurality of processing layers including one or more activation function layers that convert an input value by using a predetermined activation function, the activation function of the one or more of the activation function layers being a modulo operation function including a modulo operation and a division operation executed before the modulo operation, the division operation outputting a quotient of division by a divisor to the modulo operation, and the divisor of the division operation is set such that a range of values obtained by the division operation on the input value is smaller than a modulus of the modulo operation.

5. A learning apparatus configured to learn setting values of a neural network model based on predetermined learning data, the learning apparatus comprising:
   a processor configured to learn the setting values of the neural network model based on the predetermined learning data using the neural network model; and
   a result memory configured to store the setting values of the neural network learned by the processor, the neural network model includes a plurality of processing layers including one or more activation function layers that convert an input value from a preceding processing layer by a predetermined activation function, the activation function of the one or more of the activation function layers being a modulo operation function including a modulo operation and a division operation executed before a modulo operation, the division operation outputting a quotient of division by a divisor to the modulo operation, and the divisor of the division operation is set such that a range of values obtained by the division operation on the input value is smaller than a modulus of the modulo operation.

6. The learning apparatus according to claim 5, wherein the processor is further configured to:
   set the modulo operation function as the activation function of the one or more of the activation function layers when forward propagation is executed based on the neural network model, and
   set a function that is different than the modulo operation function as the activation function of the one or more of the activation function layers when backward propagation is executed to update the setting values of the neural network model.

7. A processing system comprising:
   a learning apparatus configured to learn setting values of a first neural network model based on predetermined learning data; and
   an inference apparatus configured to execute a predetermined inference process using a second neural network model corresponding to at least a part of the first neural network model, wherein:
   the learning apparatus includes a first processor configured to:
   learn setting values of the first neural network model based on the predetermined learning data using the first neural network model; and
   notify the inference apparatus of the setting values of the first neural network learned by the first processor, the first neural network model including a plurality of processing layers including one or more activation function layers that convert an input value by using a predetermined activation function, the activation function of the one or more of the activation function layers being a modulo operation function includes a modulo operation and a division operation executed before the modulo operation, the division operation outputting a quotient of division by a divisor to the modulo operation, and the divisor of the division operation is set such that a range of values obtained by the division operation on the input value is smaller than a modulus of the modulo operation, and
   the inference apparatus includes:
   a target data input device including a receiver configured to receive input target data, and a memory configured to store the received input target data; and
   a second processor configured to:
   set the notified setting values with respect to the second neural network model; and
   execute the predetermined inference process with respect to the target data using the second neural network model, the activation function of an activation function layer of the second neural network model, corresponding to at least one of the activation function layers of the first neural network model, is the modulo operation function.

8. The processing system according to claim 7, further comprising a client apparatus configured to communicate with the inference apparatus, wherein:
   the inference apparatus further includes an inference transmitter configured to transmit a result of the predetermined inference process executed using the second neural network model to the client apparatus, and
   the client apparatus includes:
   a transmitter configured to transmit the target data to the inference apparatus; and
   a third processor configured to execute a SoftMax process with respect to the result of the predetermined inference process.

9. The processing apparatus according to claim 1, wherein the divisor is larger than the modulus.

* * * * *